United States Patent

Rothberg

(10) Patent No.: US 9,696,934 B2
(45) Date of Patent: Jul. 4, 2017

(54) HYBRID SOLID STATE DRIVE (SSD) USING PCM OR OTHER HIGH PERFORMANCE SOLID-STATE MEMORY

(71) Applicant: HGST Netherlands B.V., Amsterdam (NL)

(72) Inventor: Michael Stephen Rothberg, Foothill Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/620,971

(22) Filed: Feb. 12, 2015

(65) Prior Publication Data

US 2016/0239205 A1    Aug. 18, 2016

(51) Int. Cl.
*G06F 12/02*    (2006.01)
*G06F 3/06*    (2006.01)

(52) U.S. Cl.
CPC ............ *G06F 3/064* (2013.01); *G06F 3/0604* (2013.01); *G06F 3/0679* (2013.01); *G06F 12/0246* (2013.01); *G06F 12/0253* (2013.01)

(58) Field of Classification Search
CPC ............ G06F 12/0246; G06F 12/0253; G06F 2212/205; G06F 2212/214; G06F 2212/217; G06F 3/064; G06F 3/0604; G06F 3/0679
USPC ......................................... 711/103, 112, 113
See application file for complete search history.

(56) References Cited

U.S. PATENT DOCUMENTS 8,078,794 B2    12/2011    Lee et al.
8,407,403 B2    3/2013    Prabhakaran et al.
8,904,091 B1 *    12/2014    Guda et al. .................. 711/103
2011/0072197 A1 *    3/2011    Lund et al. .................. 711/103
2011/0131346 A1 *    6/2011    Noeldner et al. ............... 710/22
2011/0138106 A1 *    6/2011    Prabhakaran ....... G06F 12/0804
                                                                711/103

(Continued)

OTHER PUBLICATIONS

Choi, Gyu S. et al, "A Hybrid SSD with PRAM and NAND Flash Memory", Microprocessors and Microsystems, vol. 36, No. 3, pp. 257-266, 1 page (May 2012)—Abstract Only.

(Continued)

*Primary Examiner* — Than Nguyen
(74) *Attorney, Agent, or Firm* — McDermott Will & Emery LLP

(57) ABSTRACT

Techniques for implementing a hybrid non-volatile memory storage system are disclosed. The hybrid memory system may include a first non-volatile memory; a second non-volatile memory; and a memory controller to analyze a type of an operation and a characteristic of the operation, to determine a state of the second non-volatile memory, and to determine whether another operation is being implemented on the second non-volatile memory, the memory controller selectively implementing an operation on one of the first non-volatile memory and the second non-volatile memory segment based on the type of the operation, the characteristic of the operation, the state of the second non-volatile memory, and whether another operation is being implemented on the second non-volatile memory such that the memory controller implements the operation on the first non-volatile memory concurrently with the other operation being implemented on the second non-volatile memory based on the type of the operation.

17 Claims, 12 Drawing Sheets

(56) References Cited

U.S. PATENT DOCUMENTS

| | | |
|---|---|---|
| 2011/0167197 A1 | 7/2011 | Leinwander |
| 2012/0096246 A1 | 4/2012 | Pio |
| 2013/0060981 A1* | 3/2013 | Horn et al. .................. 710/107 |
| 2013/0238851 A1* | 9/2013 | Chang ..................... G06F 3/061 711/113 |
| 2014/0101370 A1 | 4/2014 | Chu et al. |
| 2014/0115235 A1* | 4/2014 | Ito ....................... G06F 12/0868 711/103 |
| 2016/0179683 A1* | 6/2016 | Chen .................. G06F 12/0871 711/103 |

OTHER PUBLICATIONS

Franca-Neto, L. M. et al., "High Endurance Low Cost Hybrid Phase-Change Memory (PCM)-NAND Flash Enterprise Class Solid-State Drives", 2014 Non-Volatile Memories Workshop, 26 pages (Mar. 9-11, 2014).

Liu, Y. et al., "Hybrid SSD with PCM", retreived online from URL: <http://ieeexplore.ieee.org/xpl/articleDetails.jsp?arnumber=6137103, accessed Aug. 20, 2014>, 11th Annual Non-Volatile Memory Technology Symposium, pp. 1-5, Nov. 7-9, 1 Page (2011)—Abstract Only.

Takeuchi, K., "Hybrid Solid-State Storage System with Storage Class Memory and NAND Flash Memory for Big-Data Application", 2014 IEEE International Symposium on Circuits and Systems (ISCAS), pp. 1046-1049, 1 page (Jun. 1-5, 2014)—Abstract Only.

Takeuchi, Ken, "Hybrid Memory Architecture of PCM and NAND Flash Memories for Enterprise Storage", Department of Electrical, Electronic and Communication Engineering, Chuo University, Tokyo, Japan, 1 page (2014)—Abstract Only.

* cited by examiner

HYBRID SOLID STATE DRIVE (SSD) USING PCM OR OTHER HIGH PERFORMANCE SOLID-STATE MEMORY

BACKGROUND

Non-volatile memory storage systems are a type of memory commonly used in computer systems. Non-volatile memory such as solid state drives and hard drives provide particular benefits including, for example, the ability to store data with high data access and throughput rates. However, solid state drives using NAND flash memory have inherent limitations (e.g., low endurance, short data retention times, etc.). New types of faster non-volatile memory have been developed. However, these faster non-volatile memory types are significantly more expensive than NAND flash and have lower densities.

SUMMARY

Techniques for implementing a hybrid memory system are disclosed. In one aspect, the present disclosure relates to a hybrid memory system comprising: a first non-volatile memory, the first non-volatile memory being a first type of non-volatile memory; a second non-volatile memory, the second non-volatile memory being a second type of non-volatile memory different from the first type of non-volatile memory; and a memory controller configured to analyze a type of the operation and a characteristic of the operation, to determine a state of the second non-volatile memory, and to determine whether another operation is being implemented on the second non-volatile memory, the memory controller being further configured to selectively implement an operation on one of the first non-volatile memory and the second non-volatile memory segment based on the type of the operation, the characteristic of the operation, the state of the second non-volatile memory, and whether another operation is being implemented on the second non-volatile memory such that the memory controller is configured implement the operation on the first non-volatile memory concurrently with the other operation being implemented on the second non-volatile memory based on the type of the operation.

In accordance with additional aspects of this embodiment, the first non-volatile memory and the second non-volatile memory are within a single solid state drive.

In accordance with further aspects of this embodiment, the first non-volatile memory is one of a memristor, ReRam, and phase-change memory (PCM).

In accordance with additional aspects of this embodiment, the second non-volatile memory is NAND flash memory.

In accordance with further aspects of this embodiment, the operation is a host operation.

In accordance with additional aspects of this embodiment, a size of the first non-volatile memory is smaller than a size of the second non-volatile memory.

In accordance with additional aspects of this embodiment, the host operation is one of a read operation, a write operation, and an erase operation.

In accordance with further aspects of this embodiment, the other operation is a background operation.

In accordance with additional aspects of this embodiment, the background operation is one of a background scan, background erase, PLI self test, system data save, system area refresh, background data refresh, background defrag, wear leveling, garbage collection, read disturb data relocation, background media scan, temperature check, flush logs to disk, update drive usage log, and boot flash check.

In accordance with other aspects of this embodiment, the memory controller is configured to analyze the operation to determine whether it is a host operation or a background operation.

In accordance with further aspects of this embodiment, when it is determined that the host operation is a write operation, the memory controller is configured to cache data corresponding to the write operation to the first non-volatile memory.

In accordance with other aspects of this embodiment, when it is determined that the host operation is a read operation, the memory controller is configured to read data corresponding to read operation from the second non-volatile memory.

In accordance with additional aspects of this embodiment, the characteristic of the operation is an amount of data associated with the operation.

In accordance with additional aspects of this embodiment, when the amount of data associated with the operation is less than a predetermined threshold and the operation is a write operation, the memory controller caches the data associated the write operation on the first non-volatile memory.

In accordance with further aspects of this embodiment, the state of the second non-volatile memory is one of busy and idle.

In accordance with other aspects of this embodiment, when the state is busy, the memory controller implements the operation on the first non-volatile memory, and when the state is idle, the memory controller implements the operation on the first non-volatile memory when the type of operation is a first type and the second non-volatile memory when the type of the operation is a second type.

In accordance with additional aspects of this embodiment, the memory controller is configured to queue the operation based on the state of the second non-volatile memory.

In accordance with additional aspects of this embodiment, the operation is queued for implementation on the second non-volatile memory based on the type of the operation.

Another aspect of the present disclosure relates to a computer program product comprised of a series of instructions executable on a computer, the computer program product performing a process for implementing a hybrid memory system; the computer program implementing the steps of: storing first data in a first non-volatile memory; storing second data a second non-volatile memory different from the first non-volatile memory; analyzing a type of the operation and a characteristic of the operation; determining a state of the second non-volatile memory; determining whether another operation is being implemented on the second non-volatile memory; and selectively implementing an operation on one of the first non-volatile memory and the second non-volatile memory segment based on the type of the operation, the characteristic of the operation, the state of the second non-volatile memory and whether another operation is being implemented on the second non-volatile memory such that wherein the operation is implemented on the first non-volatile memory concurrently with the other operation being implemented on the second non-volatile memory based on the type of the operation.

In some embodiments, the techniques may be realized as a method for implementing a hybrid memory system comprising: storing first data in a first non-volatile memory; storing second data a second non-volatile memory different from the first non-volatile memory; analyzing a type of the operation and a characteristic of the operation; determining a state of the second non-volatile memory; determining whether another operation is being implemented on the second non-volatile memory; and selectively implementing an operation on one of the first non-volatile memory and the second non-volatile memory segment based on the type of the operation, the characteristic of the operation, the state of the second non-volatile memory and whether another operation is being implemented on the second non-volatile memory, wherein the operation is implemented on the first non-volatile memory concurrently with the other operation being implemented on the second non-volatile memory based on the type of the operation.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure generally relates to a hybrid solid state drive. In one aspect of the present disclosure, the hybrid solid state drive may include multiple types of non-volatile memory performing different functions. For example, a larger non-volatile memory may primarily function to store data for longer periods of time while a smaller non-volatile memory may function to cache certain data as well as store translation tables. Accordingly, the lifespan of a hybrid solid state drive in accordance with the present disclosure may be extended over traditional non-volatile memory.

Figure 1:
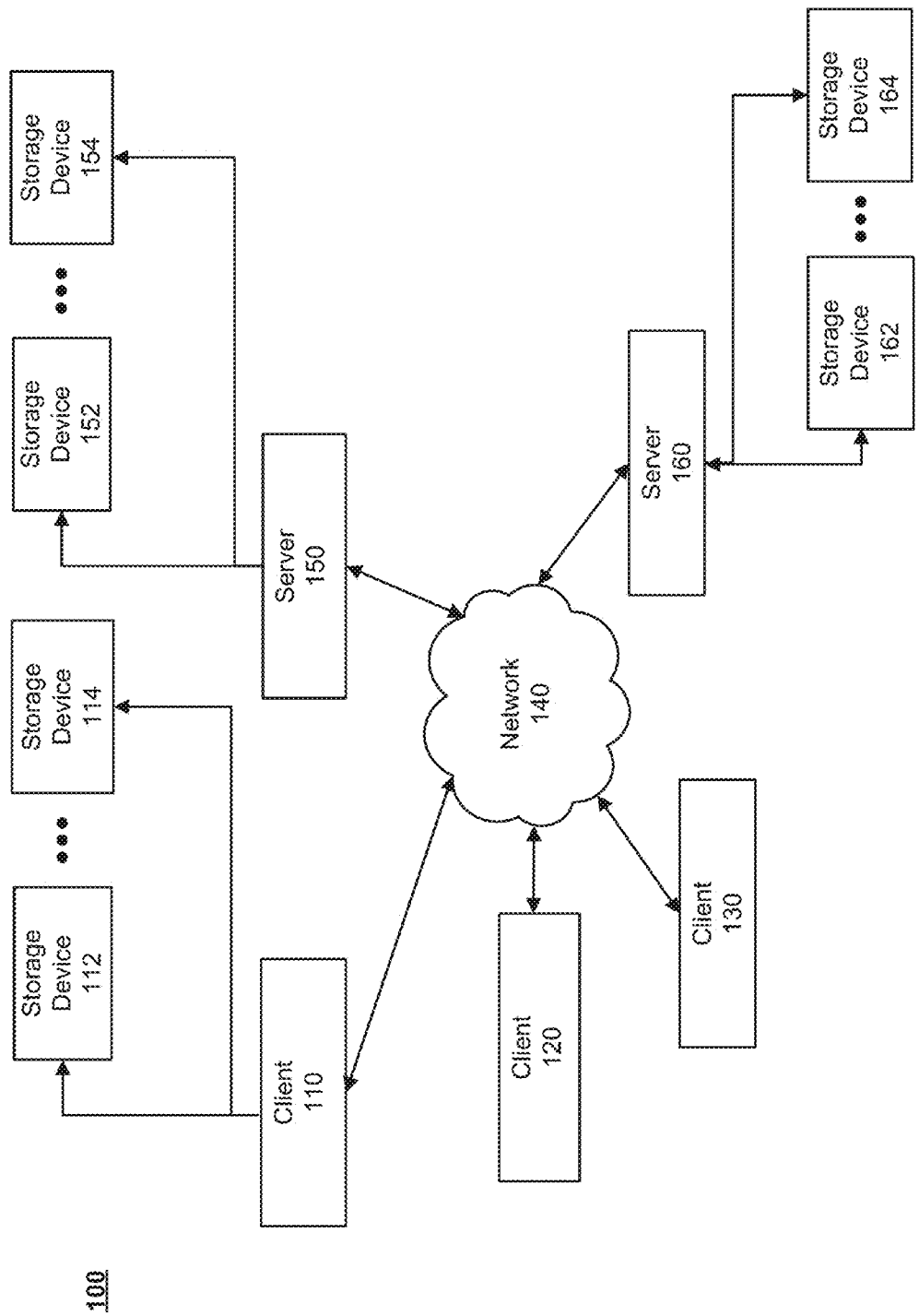
FIG. 1 shows a block diagram depicting a computing architecture in accordance with an embodiment of the present disclosure.

FIG. 1 shows a block diagram depicting a computing architecture 100 in accordance with an embodiment of the present disclosure. The computing architecture 100 may include additional elements that are not depicted. Computing architecture 100 may contain client computing systems 110, 120 and 130, as well as servers 150 and 160. The servers 150 and 160 may implement the computing system 200 shown in FIG. 2. Each of the clients 110-130 and the servers 150-160 may be communicatively coupled to a network 140. Client 110 may be connected to a plurality of storage devices 112 and 114. Each of the clients 120 and 130 may also be connected to a plurality of storage devices (not illustrated). Server 150 may be connected to a plurality of storage devices 152 and 154. Server 160 may be connected to a plurality of storage devices 162 and 164. Although only two storage devices are illustrated as being coupled to the servers 150 and 160, additional storage devices may be provided. In some instances, the storage devices 152, 154, 162, and 164 may be hybrid non-volatile memory storage systems. For example, the storage devices 152, 154, 162, and 164 may be solid-state memory (e.g., flash memory, solid state device (SSD), etc.), optical memory, magnetic memory, or a hybrid solid state drive.

Figure 2:
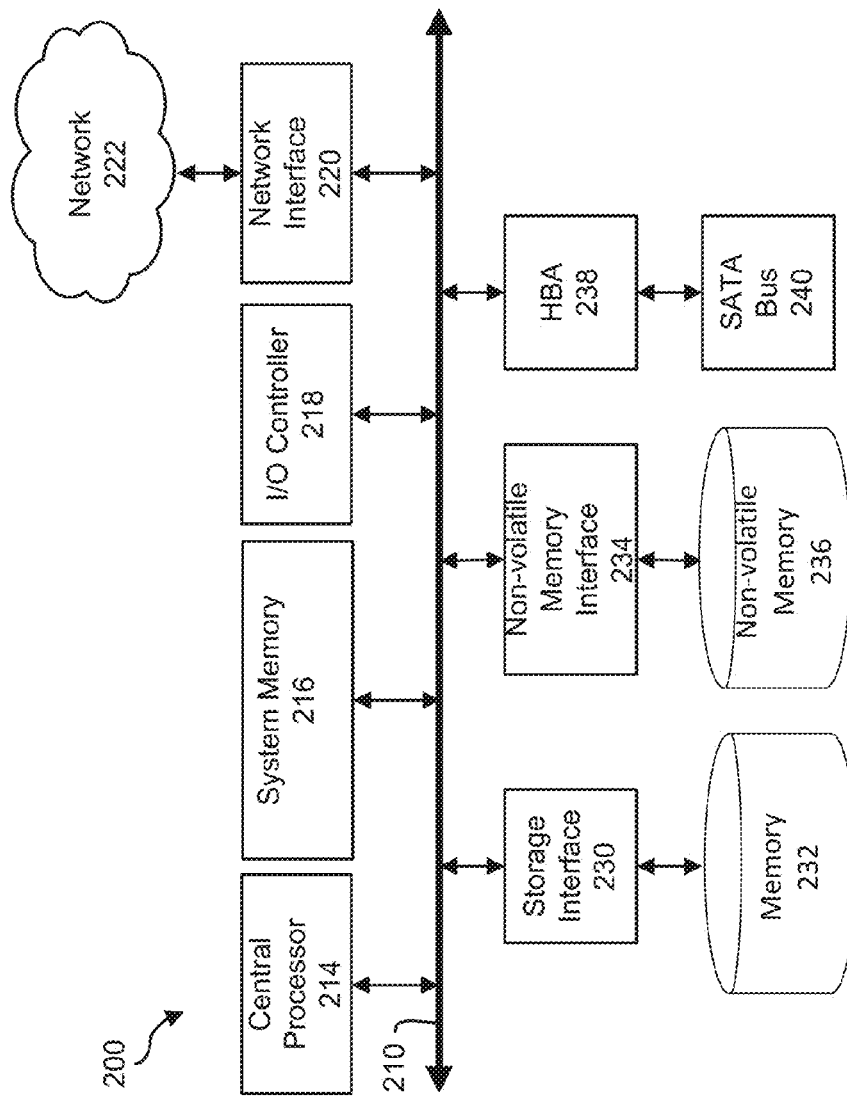
FIG. 2 shows a block diagram depicting a computer system in accordance with an embodiment of the present disclosure.

FIG. 2 shows a block diagram depicting a computer system 200 in accordance with an embodiment of the present disclosure. The computer system 200 may contain a bus 210 connecting subsystems of computer system 200 including a central processor 214, a system memory 216 (e.g., RAM (Random Access Memory), ROM (Read Only Memory), flash RAM, etc.), an Input/Output (I/O) controller 218, and a network interface 220. The network interface 200 may communicatively couple the computer system 200 to a network 222 (e.g., a local area network, wide area network, the internet, etc.). The bus 210 may also connect a storage interface 230 to memory 232, a non-volatile memory interface 234 to non-volatile memory 236, and a host bus adapter (HBA) to a serial ATA (SATA) bus 240. The SATA bus 240 may connect the computer system 200 to additional storage systems. The computer system 200 may contain additional devices or subsystems not illustrated.

Figure 3:
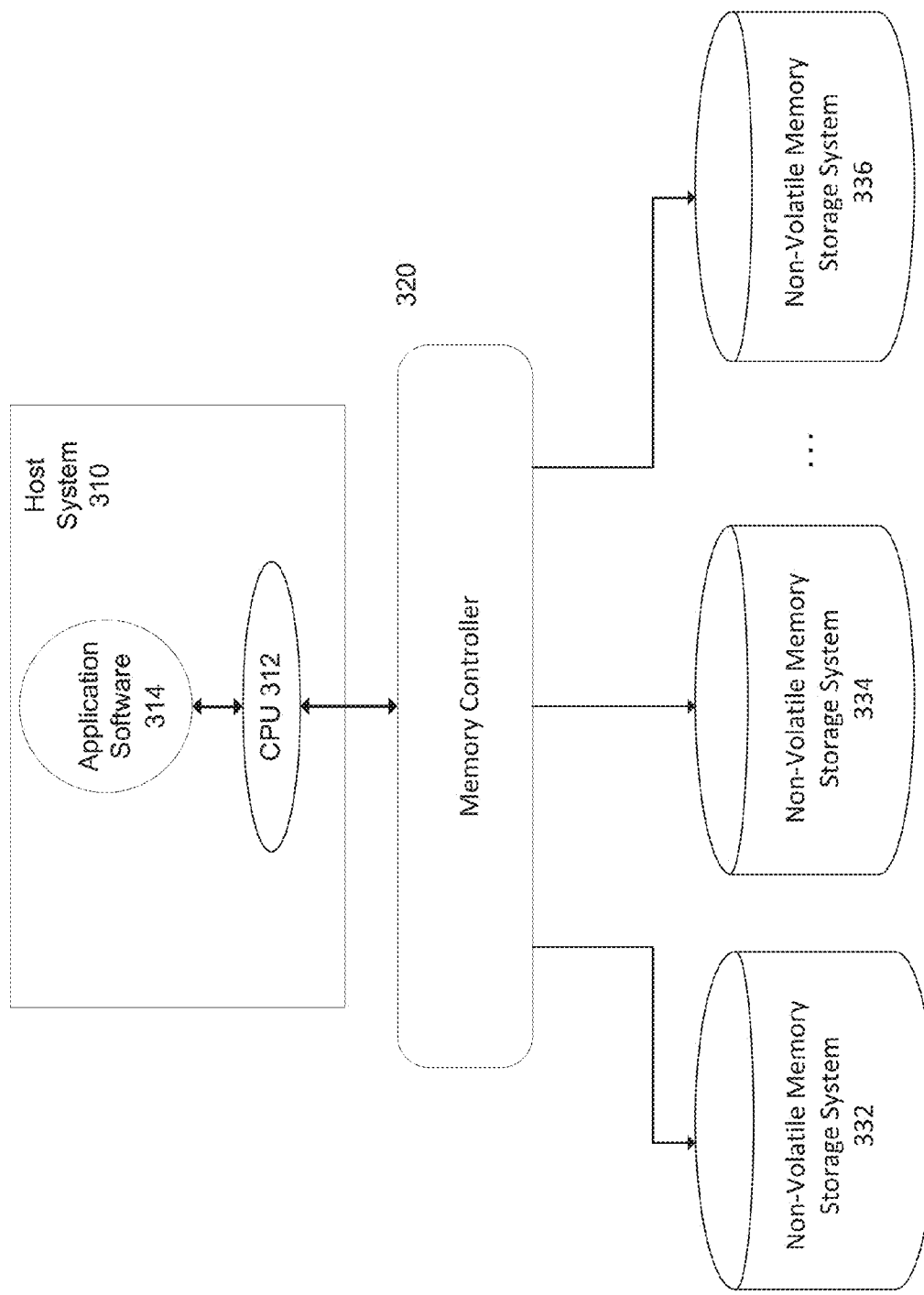
FIG. 3 shows an exemplary block diagram depicting a non-volatile storage system in accordance with an embodiment of the present disclosure.

FIG. 3 shows a block diagram depicting a non-volatile memory storage system 300 in accordance with an embodiment of the present disclosure. The non-volatile memory storage system 300 may include a host system 310, a memory controller 320, and non-volatile memory storage systems 332-336. The non-volatile memory storage system 300 may be implemented on any one of the clients 110-130 and the servers 150 and 160. For example, any one of the clients 110-130 and the servers 150 and 160 may be the host system 320 having at least one CPU 312 implementing application software 314. In some instances, the host system 310 may execute application software 314 on at least one CPU 312 to execute operations on the non-volatile memory storage systems 332-336 via the controller 320.

The application software 310 may be any applicable software for executing operations (read, write, erase, control operations, etc.) on the non-volatile memory storage system 300. For example, the application software 310 may read or write data stored on any one of the non-volatile memory (NVM) storage systems 332-336. The application software 310 may implement the operations on the NVM storage systems 332-336 via the controller 320.

The memory controller 320 shown in FIG. 3 may be a memory controller for implementing operations on the attached NVM storage systems 332-336. In particular, the memory controller 320 may provide processors (e.g., CPU 312) implementing the application software 314 access to the NVM storage systems 332-336. In some instances, the memory controller 320 may be implemented on each of the NVM storage systems 332-336 or as part of a separate computer system (e.g., server 150). In other instances, a single memory controller may be provided to control the NVM storage systems 332-336. The controller 320 may provide buffers or queues that temporarily store operations to be implemented on the NVM storage systems 332-336. The controller 320 may also function as a flash translation layer (FTL) to handle operations with respect to the NVM storage systems 332-336.

In some embodiments, the NVM storage systems 332-336 may include multiple types of non-volatile memory. For example, NVM storage systems 332-336 may include a larger slower non-volatile memory (e.g., NAND flash memory) and a smaller fast non-volatile memory (e.g., phase change memory). The controller 320 may control operations with respect to the hybrid NVM storage systems 332-336. The operations may include, for example, reads, writes, erase operations, garbage collection, and additional background operations. The controller may also control which operations are implemented on the fast NVM and which operations are implemented on the slower non-volatile memory (e.g., NAND flash).

Figure 4:
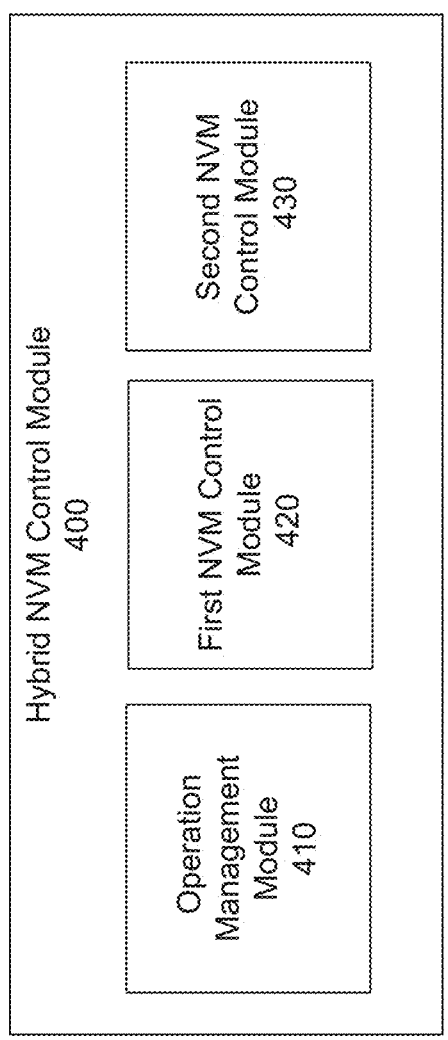
FIG. 4 shows a block diagram depicting a hybrid non-volatile memory control module in accordance with the present disclosure.

FIG. 4 shows a hybrid NVM control module 400 in accordance with an embodiment of the present disclosure. As illustrated, the hybrid NVM control module 400 may contain one or more components including an operation management module 410, a first NVM control module 420, and a second NVM control module 430.

The operation management module 410 may manage operations executed on each of the NVM storage systems 332-336. As described further below, the NVM storage systems 332-336 may implement a variety of operations including, for example, reads, writes, and erases. In addition, various background operations may be performed with respect to the NVM storage systems 332-336. The operation management module 410 may control the operations to be executed on the NVM by determining whether the operation should be implemented on a faster NVM (e.g., phase-change memory) or slower NVM (e.g., NAND flash). In addition, the operation management module 410 may communicate with the first NVM control module 420 and the second NVM control module 430 based on the determined operation type.

The operation management module 410 may also manage the operations to be implemented with respect to the NVM to extend the overall lifespan of the memory. In particular, the operation management module 410 may cause certain operations to be performed in the fast NVM since the slower NVM (NAND flash) has a limited number of writes/reads/erases that may be performed over its lifespan. For example, the operation management module 410 may cause data to be written to the fast NVM when the data is less than a full block or page. Accordingly, when a full page of data is stored in the fast NVM, the hybrid NVM control module 400 may then cause the full page to be written to the slower NVM. In addition, exceptions may be managed in the fast NVM leading to reduced write amplification. Further, by reducing the overall number of program/erase cycles to the slower NVM, memory endurance may be improved.

In another instance, the operation management module 410 may cause translation tables to be stored in the fast NVM. Traditionally, translation tables are stored separate DRAM or in power loss imminent (PLI) protected memory by adding large capacitors. However, these capacitors add cost, consumer power, and take up a significant amount of physical space in the memory. By storing the translation tables in the fast, the size of the slower NVM may be increased and potentially reduced in cost.

The operation management module 410 may also cache certain data to the fast NVM instead of writing through to the slower larger NVM. For example, the operation management module 410 may cache small block writes on the fast NVM. The operation management module 410 may also cache data that is frequently written to the same location. In addition, the caching certain data to the fast NVM, the operation management module 410 may control background operation such as garbage collection. Garbage collection is a process of returning unused blocks of data to a free pool when a superblock is free. As part of this operation, the operation management module 410 may store data remaining from mostly empty superblocks in fast NVM such that superblocks may be returned to the free pool sooner. In addition, the operation management module 410 may cache superblocks in the fast NVM and distribute the total number of writes and erases across a larger portion of the NVM such that overprovisioning is reduced. Further, the operation management module 410 may delay certain operations to be implemented on the slower NAND. For example, the operation management module 410 may use the fast NVM to delay "quick writes" to the same slower memory block. This may increase the average dwell time for the slower NVM and increase memory retention.

The first NVM control module 420 may control operations to be implemented on the faster NVM. For example, the first NVM control module 420 may control reads, writes, erases, and other background operations to be executed with respect to the faster NVM as directed by the operation management module 410.

The second NVM control module 430 may control operations to be implemented on the slower NVM. For example, the second NVM control module 430 may control reads, writes, erases, and other background operations to be executed with respect to the slower NVM as directed by the operation management module 410.

Figure 5:
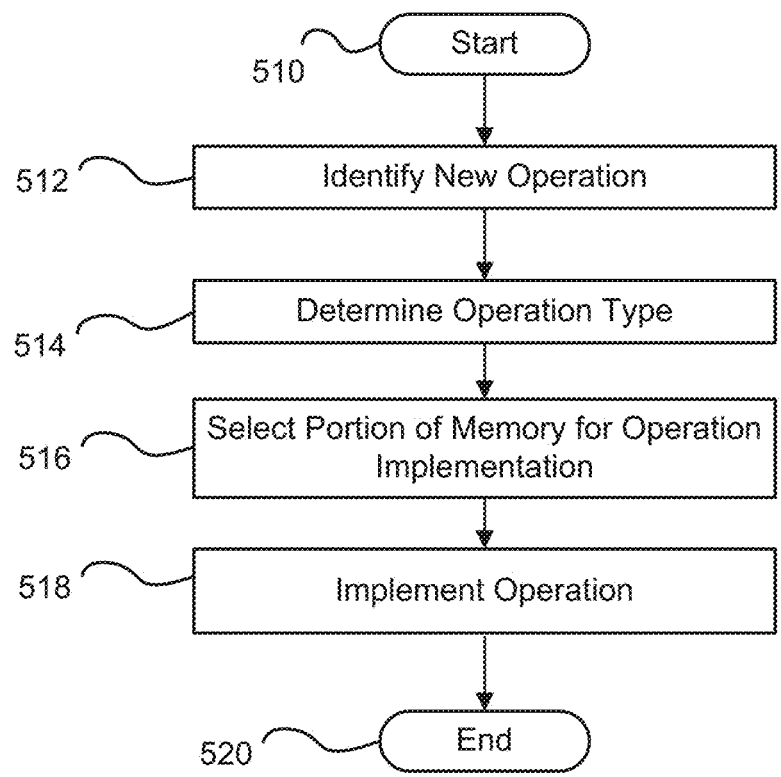
FIG. 5 depicts flowchart illustrating a method for implementing a non-volatile storage system in accordance with the present disclosure.

FIG. 5 shows a method 500 for a method for implementing a non-volatile storage system in accordance with the present disclosure. In some embodiments, the method 500 may be performed at a hardware level such as controller 320 and a non-volatile memory storage system 332. At block 510, the method 500 may begin.

At block 512, a new operation to be executed with respect to the memory may be identified. In some instances, the new operation may be issued by a host and received by the hybrid NVM control module 400. In one example, an operation such as a read or write may be received from the host. In another example, the operation may be identified as a background operation to be implemented with respect to the NVM. After the operation has been received at block 512, the overall process may proceed to block 514.

At block 514, the type of operation received at block 512 may be determined. In some embodiments, the operation management module 410 may determine the type of operation to be implemented with respect to the NVM. For example, the operation management module 410 may determine that the new operation is a read, write, or erase operation. In other instances, the operation management module 410 may determine that the new operation is a background operation (e.g., background garbage collection, error correction, etc.). After the type of operation has been determined at block 514, the overall process may proceed to block 516.

At block 516, the portion of the memory to implement the operation on may be determined. In some embodiments, the operation management module 410 may determine which portion of the memory to implement the operation received at block 512. For example, the operation management module 410 may determine that the new operation should be implemented on the faster portion of the NVM (e.g., PCM) based on the type of the new operation determined at block 514. The selection may also be based on specific aspects of the operation. For example, if the operation is a write but the data is less than a full page, the operation may be selectively implemented on the faster NVM such that the data is cached. In another instance, the operation management module 410 may determine that the operation should be implemented on the slower NVM (e.g., NAND flash). Furthermore, the operation management module 410 may determine which portion of the memory to implement the operation on based on the states of the drives. For example, if the slower NVM is in a busy state performing a write operation, the fast NVM may be selected for implementation. After portion of the memory to implement the operation has been determined at block 516, the overall process may proceed to block 518.

At block 518, the operation may be implemented on the relevant portion of the NVM. In some embodiments, the first NVM control module 420 and the second NVM control module 430 may implement the operation on the respective portions of the NVM. After the operation has been implemented or implementation has been initialized, the overall proceed may proceed to block 520.

At block 520, the process may end. In some embodiments, the process may proceed back to step 510 and may be repeated periodically or continuously.

Figure 6:
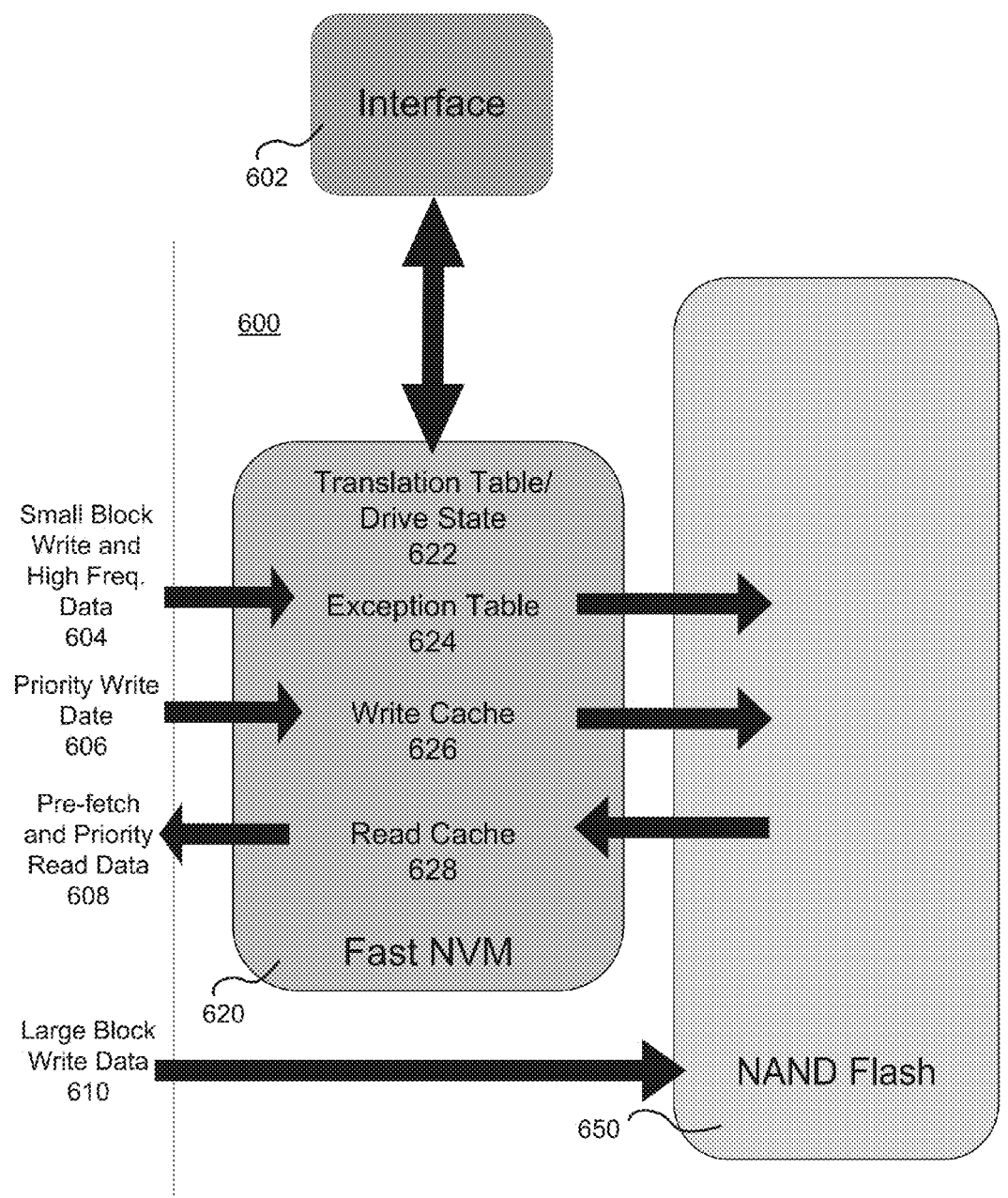
FIG. 6 depicts an implementation of a hybrid solid state drive in accordance with an embodiment of the present disclosure.

FIG. 6 shows an implementation of a hybrid solid state drive 600 in accordance with an embodiment of the present disclosure. The method 500 described above may be implemented with respect to the hybrid solid state drive 600 in accordance with embodiments of the present disclosure. In some embodiments, the hybrid solid state drive 600 may include two types of non-volatile memory: fast NVM 620 and NAND flash 650. The fast NVM 620 may be any one of a number of faster NVM memory types including, for example, memristor, ReRam, phase-change memory, etc. In this embodiment, the NAND flash 650 has a storage capacity larger than the fast NVM.

In general, the hybrid solid state drive 600 may store data arranged in banks of die, where each die includes multiple planes. Each plane may store multiple blocks of data each including multiple pages. Data is generally written to solid state drives on a page basis. In accordance with embodiments of the present disclosure, large blocks of data having a number of pages exceeding a preset threshold may be stored directly in the NAND flash 612. In other instances, smaller blocks of data having a number of pages less than the preset threshold may be stored in the fast NVM 610. Further, data having less than a full page size may be stored in the fast NVM 610.

As shown in FIG. 6, the fast NVM 620 of the hybrid solid state drive 600 may store an exception table 624, function as a write cache 626, and function as a read cache 628 between a host (not shown) and the NAND flash 650. Small block writes and data having high frequency access 604 may be handled by the fast NVM 620. Priority writes 606 may be cached in the NAND flash 620 and pre-fetching and priority reads 608 may also be cached in the NAND flash 620. In addition, the fast NVM 620 may store an exception table 624 and a translation table as well as a drive state 622. Accordingly, when a command is received from interface 602, the translation table and drive state 622 may be retrieved from the fast NVM 620 and the appropriate address on the memory 600 may be accessed when the drive is in the appropriate state. Further, by storing the translation table 622 in the fast NVM 610 instead of a volatile DRAM, the translation table 622 does not need to be flushed to the NAND flash 650 upon loss of power.

Figure 7A:
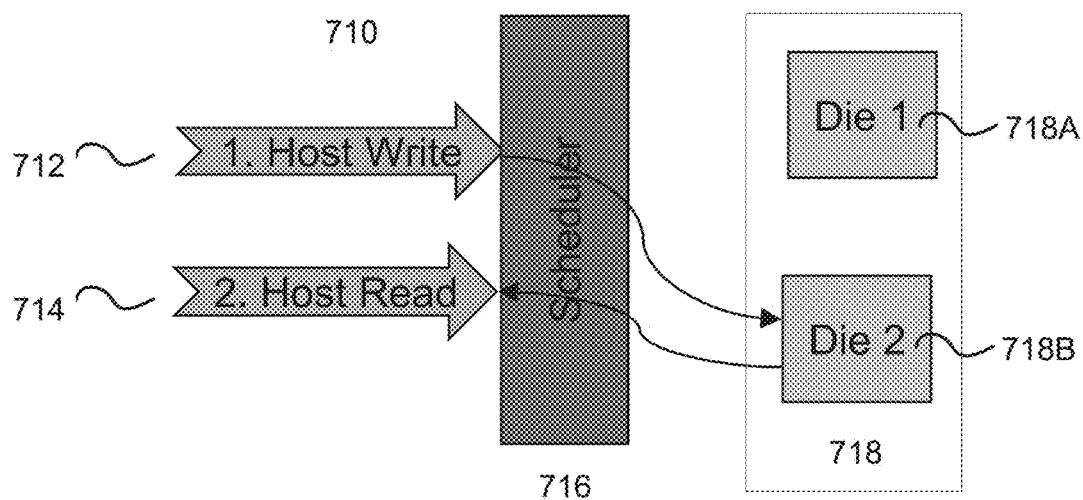
FIGS. 7A and 7B show examples of colliding operations implemented on a general non-volatile storage system.
Figure 7B:
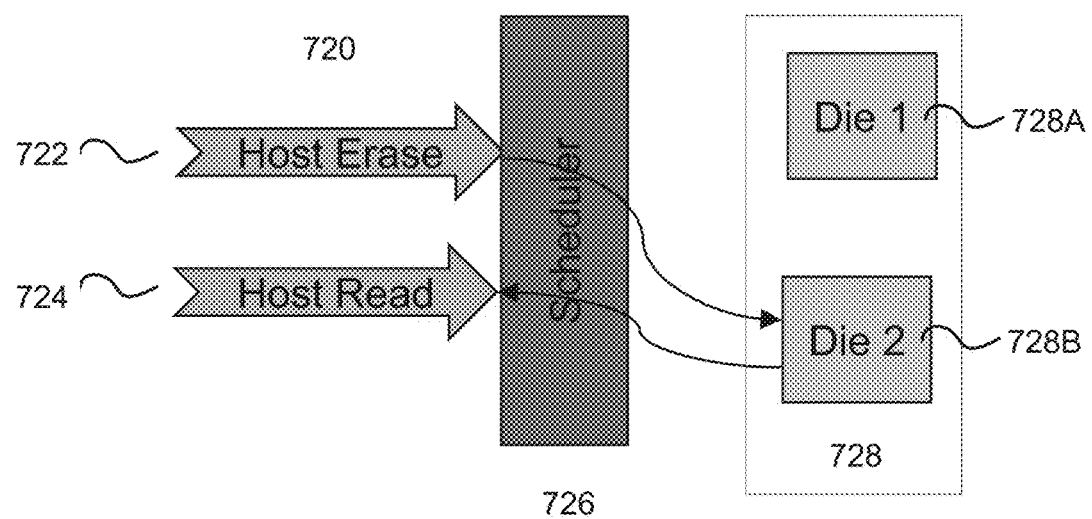

FIGS. 7A and 7B show examples of colliding operations implemented on a general non-volatile storage system. Long latencies in executing operations with respect to NVM may occur as the result of multiple commands being implemented targeting the same memory segment or die. In particular, FIGS. 7A and 7B 7 illustrate an example of write/read operations that result in memory die collisions and the corresponding delays suffered by not actively managing operations. In these examples, non-volatile storage systems 718 and 728 include a plurality of die to store data. Die 1 714A/728A and die 2 718B/728B are illustrated although additional die may be present.

FIG. 7A shows a first scenario 710 in which a host issues a write command 712 which requires a program operation on a page on die 2 718B of the memory 718. In response, the operation may implemented on die 2 718B of memory 718 and that die may be shifted to a busy state. While die 2 718B of memory 718 is in the busy state, the host may issue a read command 714 that requires the read operation to be implemented on die 2 718B. The scheduler within controller 716 may queue the read command with respect to die 2 718B since die 2 718B is in the busy state. After the write operation has been completed on die 2 718B, the read command may then be executed and data may be read from die 2 718B of memory 718. However, this collision between the read 714 and write 712 commands causes a delay in performing operations with respect to the memory 718. In particular, the host read command latency corresponds to the time to perform the die read operation in addition to the write (program) operation. The first scenario 710 may be considered a small collision between a read command 714 and a prior write command 712. However, this delay still degrades performance of the memory 718.

FIG. 7B shows a second scenario 720 in which a host first issues an erase command 722 that requires an erase operation on die 2 728B of the memory 728. In response, the erase operation 722 may be implemented on die 2 728B of memory 728 and that die may be shifted to a busy state. While die 2 728B of memory 728 is in the busy state, the host may issue a read command 724 that requires a read operation to be implemented on die 2 728B. The scheduler within controller 726 may queue the read command 724 with respect to die 2 728B since die 2 728B is in a busy state. After the erase operation has been completed on die 2 728B, the read operation may be executed and data may be read from die 2 728B. However, this collision between the read 724 and erase 722 commands causes a delay in performing operations with respect to the memory 728. In particular, the host read command 724 latency corresponds to the time to perform the die read operation in addition to the erase operation. The second scenario 720 may be considered a big collision between a read command and a prior erase command. This collision and delay degrades performance of the memory 728.

Figure 8A:
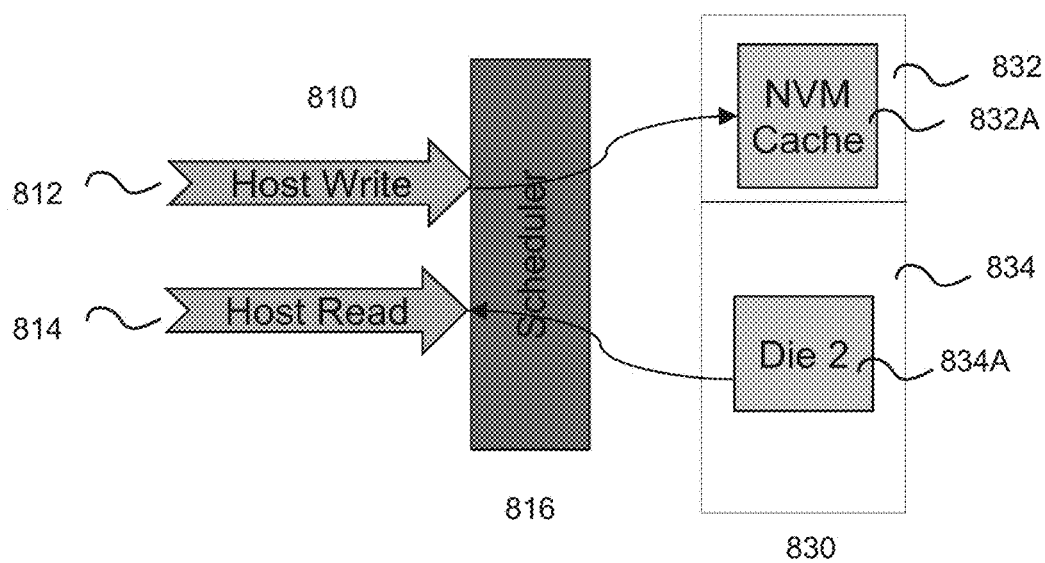
FIGS. 8A and 8B show examples of controlling die collisions in accordance with an embodiment of the present disclosure.
Figure 8B:
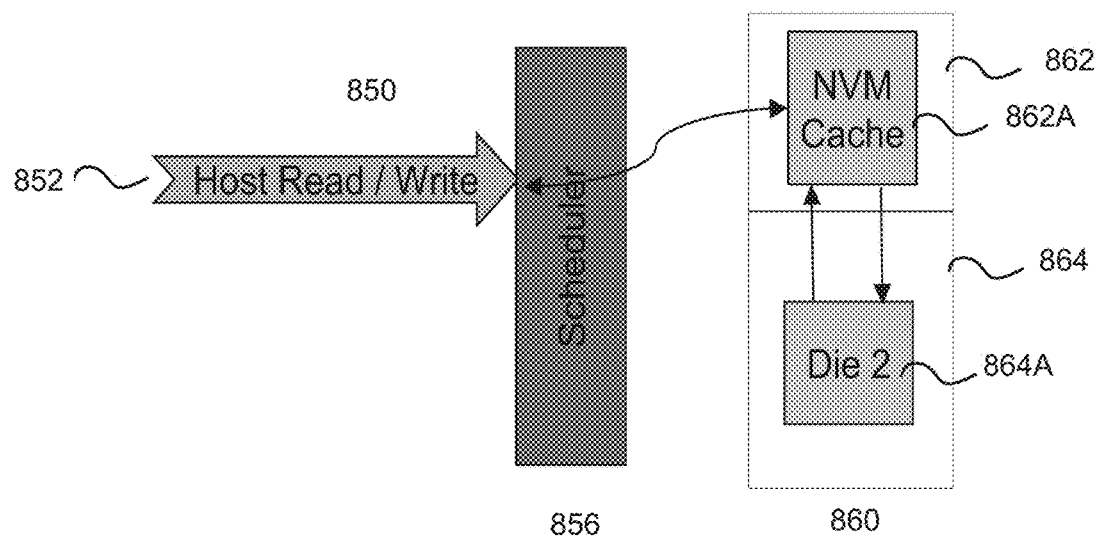

FIGS. 8A and 8B show examples of controlling die collisions in accordance with an embodiment of the present disclosure. As described above, colliding operations may degrade performance of a solid state drive by introducing delay in operations. These latencies, however, may be reduced by controlling operations implemented on a hybrid solid state drive in accordance with the present disclosure. In particular, FIGS. 8A and 8B show examples of controlling operations in accordance with the process described above with respect to FIG. 5 on the hybrid solid state drive 600 described above with respect to FIG. 6.

FIG. 8A illustrates an example of caching data to a faster NVM 832 in order to reduce the delay described above with respect to FIGS. 7A and 7B. In this example 810, a write command 812 with associated host data may be received at controller 816. Controller 816 may include a scheduler to order and handle commands received from a host. In some instances, the controller 816 may cause writes to the slower memory 834 (e.g., flash memory die 2 834A) of memory 830 to be buffered by writing data to the faster NVM 832 (NVM cache 832A) instead of writing directly to the slower memory 834.

Upon receipt of a write command 812, the controller 816 may analyze the operation (e.g., write) associated with the received command and corresponding data. In this instance, the controller 816 may determine that the data should be cached to the faster NVM 832 (NVM cache 832A) instead of written to the slower memory 834 (e.g., flash memory die 2 834A) of memory 830. The controller 816 may determine to cache the data associated with the command because the amount of data is less than a full page in this instance. After receiving the write command 812, the controller 816 may receive a read command 814 from the host. Upon receipt of the read command 814, the controller 816 may analyze the operation (e.g., read) associated with the received command 814. In this instance, the controller 816 may determine that the data to be read is stored in the slower memory 834 (e.g., flash memory die 2 834A) of memory 830 such that a read operation may be implemented on the slower memory 834 without waiting for the write operation associated with the write command 812 to be completed. This accordingly removes the delay described above with respect to FIGS. 7A and 7B. Additionally, the controller 816 may determine that the data is cached in the faster NVM 832 (NVM cache 832A) and the controller 816 may cause the data to be read from the faster NVM 832 (NVM cache 832A). As a result, fewer writes to the slower memory 834 may increase the overall life of the memory 830.

FIG. 8B shows an example 850 of handling operations to be implemented with respect to memory 860. Memory 860 may include a faster NVM 862 including NVM cache 864A and a slower NVM memory 864 comprising die 2 864A. In this instance, when the amount of data in the faster NVM 862 (NVM cache 864A) reaches a predetermined threshold, related data remaining in the slower memory 864 (e.g., flash memory die 2 864A) of memory 860 not already cached in the faster NVM 862 (NVM cache 862A) may be copied to the faster NVM 862 (NVM cache 862A). As a result, the controller 822 may cause all host access requests (e.g., reads/writes) targeting the slower memory 864 (e.g., flash memory die 2 864A) to first go through the faster NVM cache 862A.

In another instance, the data stored in the faster NVM 862 (NVM cache 862A) may be transferred to the slower memory 864 (e.g., flash memory die 2 864A) as part of an erase operation. The faster NVM 862 (NVM cache 862A) may then be available to cache data associated with a different portion (e.g., another die) of the slower memory 864 or new data received from the host. The faster NVM 862 (NVM cache 862A) may also store data from different portions of the slower memory 864 (e.g., different flash memory die) and use a predictive algorithm to determine which data to flush to the slower memory 864. The faster NVM 862 (NVM cache 862A) may further store data from different portions of the slower memory 864 (e.g., different flash memory die) and flush data to the slower memory 864 based on which portion of the memory has the most data stored in the faster NVM 862 (NVM cache 862A). In some instances, flushing the data stored in the faster NVM 862 (NVM cache 862A) be combined with a background scan process. For example, the portion of the slower memory 864 (e.g., flash memory die 2 864A) may be erased and reloaded from the faster NVM 862 (NVM cache 862A) in a background operation while any host requests may also be executed on the faster NVM 862 (NVM cache 862A).

Figure 9A:
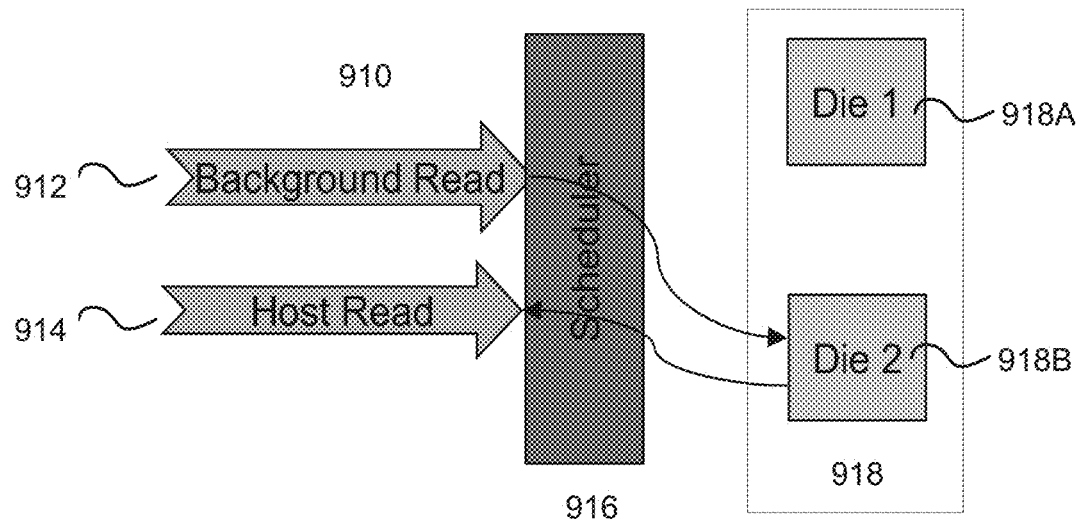
FIGS. 9A and 9B show examples of handling background operations in accordance with an embodiment of the present disclosure.
Figure 9B:
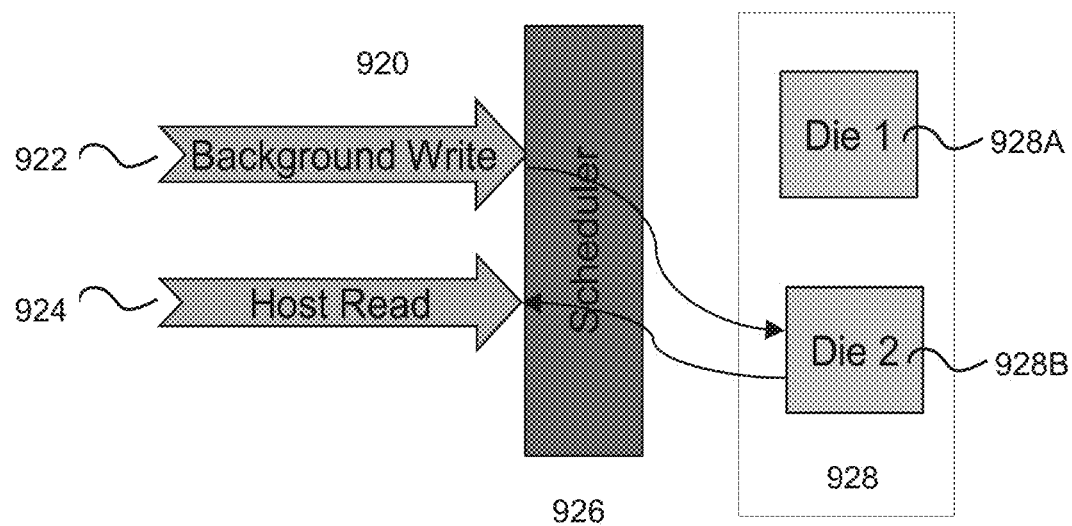

FIGS. 9A and 9B show examples of handling background operations in accordance with an embodiment of the present disclosure. In general, a memory controller (e.g., memory controller 320) interfaces with memory and a host to enable reads, writes, and erases. The memory controller also interfaces with the memory to perform background management operations with respect to the memory. However, these operations may negatively impact memory performance due to, for example, reduced interface bandwidth available to the host. In order to compensate for this reduction in performance, the memory controller may buffer background operations in a faster portion of the memory. For example, the memory controller 320 may cause background operations to be buffered in a faster NVM (e.g., PCM) of NVM storage system 332 of FIG. 3. This can accordingly improve latency and performance of the memory.

Table 1 below shows examples of background operations that may be implemented with respect to memory:

TABLE 1

| Background Tasks | Interval |
| --- | --- |
| PLI Self Test | 24 Hours |
| Background Erase | As needed based on Host Write Activity |
| System Data Save | As needed based on Host Write Activity |
| System Area Refresh | Two Weeks or 200 Power Cycles |
| Background Data Refresh | The complete drive every two days |
| Background Defrag, Wear Leveling | As needed based on Host Write Activity |
| Read Disturb Data Relocation | As needed based on Host Read Activity |
| Background Media Scan | Mode Page 0x1C, Sub Page 0x01 |
| Temperature Check | One Second |
| Flush Logs to Disk | If 1 s Idle and Logs have Changes, 20 Minutes, or if RAM Logs are Full |
| Update Drive Usage Log | 30 Minutes |
| Boot SPI Flash Check | 24 Hours |

Implementation of these background operations may lead to host command (e.g., read/write/erase) delays. FIG. 9A illustrates an example of an operation collision with respect to memory 918. Memory 918 may include die 1 918A and die 2 918B, as well as additional die not shown. In particular, FIG. 9A shows a first scenario 910 in which controller 916 receives a background read 912 from a host. In this instance, the controller 916 may allow the background read 912 to be implemented on die 2 918B of memory 918 since no other operations are currently being implemented. Subsequent to the execution of the background read 912, the controller 916 may receive another command from the host to read data 914. The controller 916 may analyze the read command 914 from the host and determine that the read targets die 2 918B of memory 918. Accordingly, the controller 916 may queue the read command 914 for execution following completion of the background read 912. This introduces a delay, however, in the implementation of the host command.

FIG. 9B illustrates another example of an operation collision with respect to memory 928. Memory 928 may include a include die 1 928A and die 2 928B, as well as additional die not shown. In particular, FIG. 9B shows a second scenario 920 in which controller 926 receives a background write 922 from a host. In this instance, the controller 926 may allow the background write 922 to be implemented on die 2 928B of memory 928 since no other operations are currently being implemented. Subsequent to the execution of the background write 922, the controller 926 may receive another command from the host to read data 924. The controller 926 may analyze the read command 924 from the host and determine that the read targets die 2 928B of memory 928. As a result, the controller 926 may queue the read command 924 for execution following completion of the background write 922. This introduces a longer delay, however, in the implementation of the host command since background writes generally take longer than background reads. In another instance, the background operation may be a background scan which requires erasing a block in die 2 928B such that any subsequent host operations may be significantly delayed.

Figure 10A:
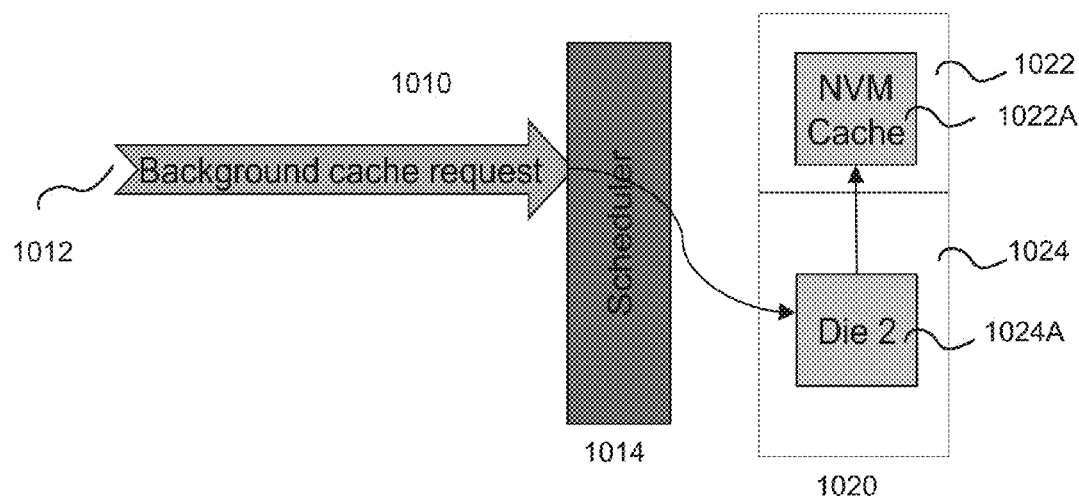
FIGS. 10A and 10B show examples of handling background operations in accordance with an embodiment of the present disclosure.
Figure 10B:
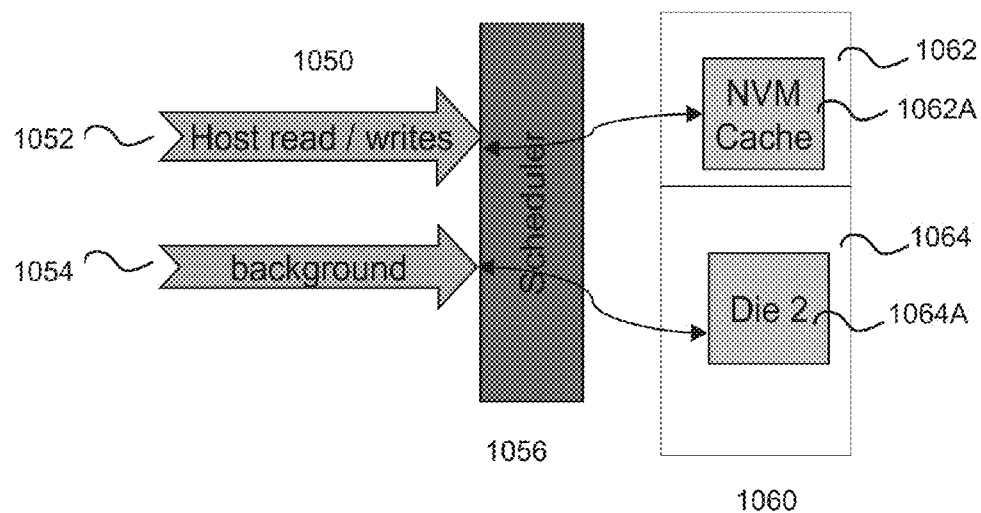

FIGS. 10A and 10B show examples of handling background operations in accordance with an embodiment of the present disclosure. As described above, colliding background and host operations may degrade performance of a solid state drive by introducing delay. There latencies, however, may be reduced by controlling operations implemented on a hybrid solid state drive in accordance with the present disclosure. In particular, FIGS. 10A and 10B show examples controlling background and host operations in accordance with the process described above with respect to FIG. 5 on the hybrid solid state drive 600 described above with respect to FIG. 6.

FIG. 10A illustrates an example 1010 of handling a background cache request 1012 with respect to memory 1020. Memory 1020 may include a include a faster memory 1022 having a NVM cache 1022A and a slower memory 1024 having die 2 1024A. In this example, upon receipt of the background cache request 1012, the controller 1014 may analyze the operation associated with the received background cache request 1012. Based on the analysis, the controller 1014 may allow execution of the background cache request 1012 such that the contents of die 2 on the slower portion 1024 of the memory 1020 are copied to the NVM cache 1022A in the faster portion 1022 of the memory 1020.

FIG. 10B illustrates an example 1050 of handling host commands and a background operation with respect to memory 1060. Memory 1020 may include a include a faster memory 1022 having a NVM cache 1022A and a slower memory 1024 having die 2 1024A. In particular, FIG. 10B shows an instance of controller 1056 receiving a host command (e.g., read or write) 1052 subsequent to initiation of the background cache request 1012 described above with respect to FIG. 10A. Upon receipt of the host command 1052, the controller may analyze the received command 1052 and implement the operation associated with the command 1052 on the faster portion 1062 of the memory 1060. The controller 1056 may also execute the operation associated with the host command 1052 while also performing a background operation 1054. Accordingly, host commands may be implemented without delay while also executing background operations with respect to the memory 1060.

Figure 11A:
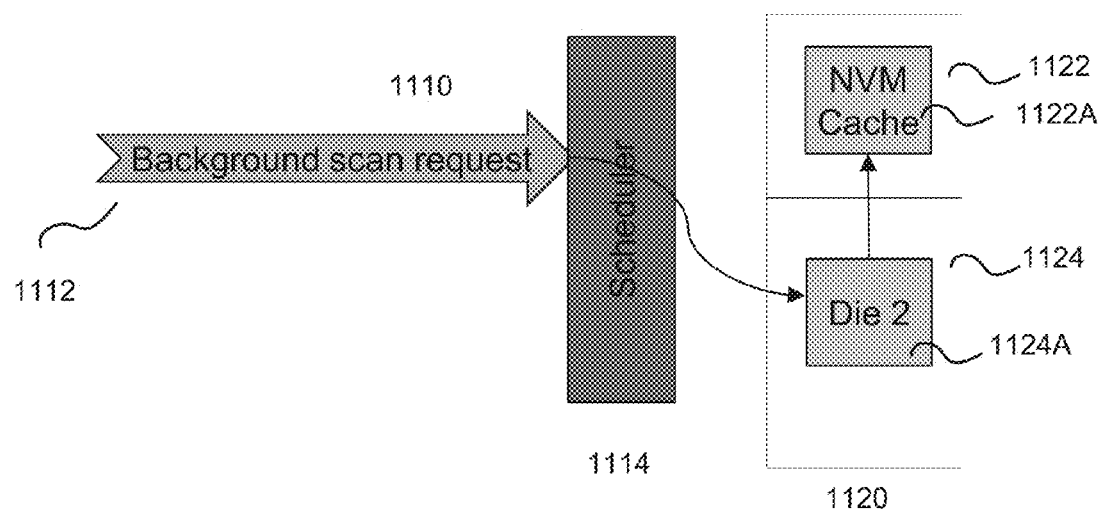
FIGS. 11A and 11B show another example of handling background operations in accordance with an embodiment of the present disclosure.
Figure 11B:
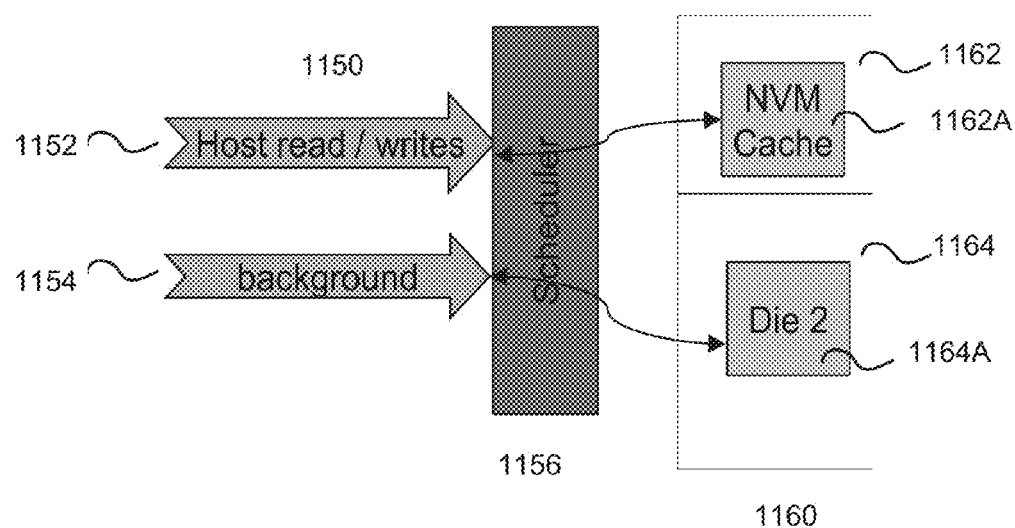

FIGS. 11A and 11B show another example of handling background operations in accordance with an embodiment of the present disclosure. This example is similar to that described above with respect to FIGS. 10A and 10B. However, in this instance, the background operation may be a high performance refresh scan including a background scan used to repair bad sectors, rewrite degraded data, and relocate degraded blocks.

FIG. 11A illustrates a controller 1114 receiving a background scan request 1112 from a host with respect to memory 1120. Memory 1120 may include a include a faster memory 1122 having a NVM cache 1122A and a slower memory 1124 having die 2 1124A. In this instance, the controller 1114 may initiate execution of the background scan request 1112 on the slower portion 1124 of the memory 1120. Accordingly, data may be copied from the slower portion 1124 of the memory 1120 to the faster portion 1122 having a NVM cache. As part of the copying of data, error correction may be performed. Generally, advanced error correction techniques are not performed because they degrade performance. However, in this instance, advanced error correction techniques may be implemented in addition to standard error techniques because host operations may be implemented concurrently with the advanced error correction techniques.

FIG. 11B illustrates an example of executing the background operation (e.g., background scan request) 1154 while also allowing for the execution of host commands with respect to memory 1160. Memory 1160 may include a include a faster memory 1162 having a NVM cache 1162A and a slower memory 1164 having die 2 1164A. In this instance, the background scan request may be initiated as described above with respect to FIG. 11A. If a sector of data being copied from the slower portion 1164 of the memory 1160 to the faster portion 1162 is weak, standard error recovery may be performed. However, if the standard error recovery does not sufficiently correct for the error, then advanced error techniques may be implemented (e.g., erasure points). Once all of the data is copied to the faster memory 1162 (e.g., NVM cache 1162A), it may be copied back to the slower portion 1164 of the memory 1160 such that if the controller 1156 receives an incoming host command (e.g., read/write), the command may be implemented on the faster memory 1162 (e.g., NVM cache 1162A) and the faster memory 1162 (e.g., NVM cache 1162A) behaves as a write through cache. The background operation may also read-verify all of the blocks and relocate any blocks with high error correction code correction levels without negatively impacting host commands.

Figure 12:
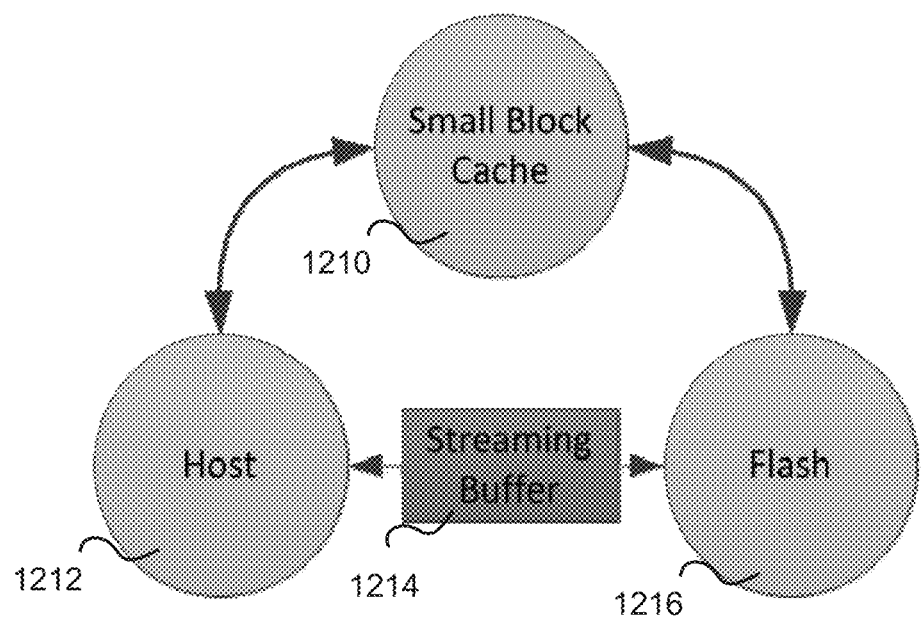
FIG. 12 shows an example of small block caching in accordance with an embodiment of the present disclosure.

FIG. 12 shows an example of small block caching in accordance with an embodiment of the present disclosure. In this instance, a small block cache 1210 may be implemented in fast NVM memory. As a result, it is not necessary to backup for flush the cached data to the flash memory 1226. Other operations from the host 1212 may be implemented directly on the flash memory 1216 via the streaming buffer 1214. However, implementing the small block cache 1210 in fast NVM memory may be particularly beneficial when the host 1212 is executing read-modify-write (RMW) operations on small block sequential, pseudo sequential, and repetitive writes. In addition, the fast NVM storing an indirection table may enable an increased table size without a write amplification penalty. By implementing this operation on the small block cache 1210 implemented in fast NVM memory, the life of the flash memory 1216 may be improved.

Other embodiments are within the scope and spirit of the invention. For example, the functionality described above can be implemented using software, hardware, firmware, hardwiring, or combinations of any of these. One or more computer processors operating in accordance with instructions may implement the functions associated with hybrid memory storage subsystems in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A hybrid memory system comprising:
a first non-volatile memory, the first non-volatile memory being a first type of non-volatile memory;
a second non-volatile memory, the second non-volatile memory being a second type of non-volatile memory different from the first type of non-volatile memory; and
a memory controller configured to:
analyze a type of a first operation and a characteristic of the first operation,
determine a state of the second non-volatile memory,
determine whether a second operation is being implemented on the second non-volatile memory,
selectively implement the first operation on one of the first non-volatile memory and the second non-volatile memory based on the type of the first operation, the characteristic of the first operation, the state of the second non-volatile memory, and whether the second operation is being implemented on the second non-volatile memory,
determine that the type of the first operation is a write operation;
determine that the characteristic of the first operation is an amount of data associated with the first operation;
determine that the amount of data associated with the first operation is less than a predetermined threshold; and
cache the data associated with the first operation in the first non-volatile memory based on the determination that the amount of data associated with the first operation is less than the predetermined threshold;
wherein the memory controller is configured to implement the first operation on the first non-volatile memory concurrently with the second operation being implemented on the second non-volatile memory based on the type of the first operation.

2. The hybrid memory system of claim 1, wherein the first non-volatile memory and the second non-volatile memory are within a single solid state drive.

3. The hybrid memory system of claim 1, wherein the first non-volatile memory is one of a memristor, ReRam, and phase-change memory (PCM).

4. The hybrid memory system of claim 1, wherein the second non-volatile memory is NAND flash memory.

5. The hybrid memory system of claim 1, wherein a size of the first non-volatile memory is smaller than a size of the second non-volatile memory.

6. The hybrid memory system of claim 1, wherein the first operation is a host operation.

7. The hybrid memory system of claim 1, wherein the second operation is a background operation.

8. The hybrid memory system of claim 7, wherein the background operation is one of a background scan, background erase, PLI self test, system data save, system area refresh, background data refresh, background defrag, wear leveling, garbage collection, read disturb data relocation, background media scan, temperature check, flush logs to disk, update drive usage log, and boot flash check.

9. The hybrid memory system of claim 1, wherein the memory controller is configured to analyze the first operation to determine whether it is a host operation or a background operation.

10. The hybrid memory system of claim 9, wherein the memory controller is configured to perform the caching of the data corresponding to the write operation to the first non-volatile memory based on a determination that the first operation is the host operation.

11. The hybrid memory system of claim 9, wherein the memory controller is configured to read data corresponding to a read operation from the second non-volatile memory.

12. The hybrid memory system of claim 1, wherein the state of the second non-volatile memory is one of busy and idle.

13. The hybrid memory system of claim 12, wherein when the state is busy, the memory controller implements the first operation on the first non-volatile memory, and when the state is idle, the memory controller implements the first operation on the first non-volatile memory when the type of the first operation is a first type and the second non-volatile memory when the type of the first operation is a second type.

14. The hybrid memory system of claim 1, wherein the memory controller is configured to queue the first operation based on the state of the second non-volatile memory.

15. The hybrid memory system of claim 14, wherein the first operation is queued for implementation on the second non-volatile memory based on the type of the first operation.

16. A non-transitory processor readable storage media storing a computer program comprising a series of executable instructions for implementing a hybrid memory system, the instructions including:
storing first data in a first non-volatile memory;
storing second data a second non-volatile memory different from the first non-volatile memory;
analyzing a type of a first operation and a characteristic of the first operation;
determining a state of the second non-volatile memory;

determining whether a second operation is being implemented on the second non-volatile memory;
selectively implementing the first operation on one of the first non-volatile memory and the second non-volatile memory based on the type of the first operation, the characteristic of the first operation, the state of the second non-volatile memory and whether the second operation is being implemented on the second non-volatile memory,
determining that the type of the first operation is a write operation;
determining that the characteristic of the first operation is an amount of data associated with the first operation;
determining that the amount of data associated with the first operation is less than a predetermined threshold; and
caching the data associated with the first operation in the first non-volatile memory based on the determination that the amount of data associated with the first operation is less than the predetermined threshold,
wherein the first operation is implemented on the first non-volatile memory concurrently with the second operation being implemented on the second non-volatile memory based on the type of the first operation.

17. A method for implementing a hybrid memory system comprising:
storing first data in a first non-volatile memory;
storing second data a second non-volatile memory different from the first non-volatile memory;
analyzing a type of a first operation and a characteristic of the first operation;
determining a state of the second non-volatile memory;
determining whether a second operation is being implemented on the second non-volatile memory;
selectively implementing the first operation on one of the first non-volatile memory and the second non-volatile memory based on the type of the first operation, the characteristic of the first operation, the state of the second non-volatile memory and whether the second operation is being implemented on the second non-volatile memory,
determining that the type of the first operation is a write operation;
determining that the characteristic of the first operation is an amount of data associated with the first operation;
determining that the amount of data associated with the first operation is less than a predetermined threshold; and
caching the data associated with the first operation in the first non-volatile memory based on the determination that the amount of data associated with the first operation is less than the predetermined threshold,
wherein the first operation is implemented on the first non-volatile memory concurrently with the second operation being implemented on the second non-volatile memory based on the type of the first operation.

* * * * *